United States Patent
Imagawa et al.

(10) Patent No.: US 8,504,897 B2
(45) Date of Patent: Aug. 6, 2013

(54) MEMORY CONTROLLER

(75) Inventors: Masayuki Imagawa, Osaka (JP); Tetsuo Furuichi, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 962 days.

(21) Appl. No.: 12/120,489

(22) Filed: May 14, 2008

(65) Prior Publication Data

US 2008/0320342 A1 Dec. 25, 2008

(30) Foreign Application Priority Data

Jun. 21, 2007 (JP) ................................ 2007-163423
Sep. 12, 2007 (JP) ................................ 2007-236847

(51) Int. Cl.
*G11C 29/00* (2006.01)
(52) U.S. Cl.
USPC ......................................... 714/768; 714/769
(58) Field of Classification Search
USPC ............................................... 714/768, 769
See application file for complete search history.

(56) References Cited

U.S. PATENT DOCUMENTS

| 5,644,709 A * | 7/1997 | Austin ............................ 714/53 |
| 7,631,245 B2 * | 12/2009 | Lasser ........................... 714/768 |
| 2003/0163756 A1 * | 8/2003 | George ............................. 714/5 |
| 2004/0243885 A1 * | 12/2004 | James et al. ..................... 714/42 |
| 2005/0210184 A1 | 9/2005 | Chen et al. |
| 2005/0276141 A1 * | 12/2005 | Pelley et al. ................... 365/221 |
| 2005/0289440 A1 * | 12/2005 | Nerl et al. ...................... 714/763 |
| 2008/0002468 A1 * | 1/2008 | Hemink ................... 365/185.17 |

FOREIGN PATENT DOCUMENTS

| JP | 6-28265 | 2/1994 |
| JP | 6-67917 | 3/1994 |
| JP | 8-129510 | 5/1996 |
| JP | 11-25006 | 1/1999 |
| JP | 2000-322330 | 11/2000 |

* cited by examiner

*Primary Examiner* — M. Mujtaba K Chaudry
(74) *Attorney, Agent, or Firm* — Oblon, Spivak, McClelland, Maier & Neustadt, L.L.P.

(57) ABSTRACT

A memory controller carries out error detection on a wide range of area of a memory cell array, which includes not only readout addresses but also non-readout addresses. Thus, by carrying out error detection at an address at which an error occurs without accessing the address for readout, it is possible to detect occurrence of an error at the address. Accordingly, it is possible to prevent a "read disturb phenomenon" in which repetition of access to a readout address for readout may probably cause an error at a non-readout address other than the readout address.

16 Claims, 10 Drawing Sheets

MEMORY CONTROLLER

BACKGROUND OF THE INVENTION

1. Field of the Invention

The present invention relates to a technique to avoid unintended rewriting of data or reduce the possibility thereof, due to repeated readouts of data from a nonvolatile memory.

2. Description of the Background Art

NAND flash memories, among nonvolatile memories, are heavily used for SD memory cards or the like for the purpose of achieving high integration, reduction in manufacturing cost and easy writing for users by simplifying circuit configurations.

In recent, NAND flash memories are adopted for game machines or the like. When the NAND flash memories are used for game machines, there occurs no write operation but only consecutive read operations. In other words, NAND flash memories have been increasingly adopted as ROMs.

Since specific programs are repeatedly read out in the game machines or the like in most cases, however, it begins to be noticed that the programs could be unintendedly rewritten. Such a phenomenon is termed "read disturb phenomenon", and the mechanism of this phenomenon will be briefly discussed below.

FIG. 11 is a schematic diagram showing a NAND flash memory. The NAND flash memory is constituted of a bit line 41 and word lines 42, 43 and 44 which are arranged in a lattice manner, memory cells 52 and 53, a selection transistor 54 and the like.

In a case where binary data ("0" or "1") stored in the memory cell 52 is read out, the memory cell 52 is a selected cell and the memory cell 53 is an unselected cell. First, the selection transistor 54 specifies the bit line 41 to which the selected cell 52 belongs. Next, a low gate voltage (V(Low)=0V) is applied to the word line 42 to which the selected cell 52 belongs. Then, a high gate voltage (V(High)) of approximately 5V) is applied to the word line 43 to which the unselected cell 53 belongs.

At that time, since the unselected cell 53 is in a very weak writing condition, electrons are trapped in a floating gate of the unselected cell 53 and accumulated therein. In other words, when binary data stored in the selected cell 52 is repeatedly read out, there is a possibility that a threshold voltage of the unselected cell 53 might be shifted and binary data stored in the unselected cell 53 might be unintendedly rewritten, being changed from "1" to "0".

Even if the binary data stored in the unselected cell 53 is unintendedly rewritten, however, when data are collectively erased before new data are written, it is possible to recover the function of the unselected cell 53. But, if there occurs no write operation and only consecutive read operations, it is impossible to recover the function of the unselected cell 53.

US Patent Application Publication No. 2005/0210184 discloses means for avoiding the above-discussed "read disturb phenomenon" by controlling the inside of a memory cell. This disclosed method, however, can be applied to a memory having a specific cell configuration but can not be applied to any other cell configuration. In other words, by this method, it is impossible to avoid the "read disturb phenomenon" without depending on cell configurations of memories.

Japanese Patent Application Laid-Open No. 8-129510 ("JP No. 8-129510") discloses means for carrying out error detection. However, a method disclosed in JP No. 8-129510 is a method of carrying out error detection at an address which is used for readout ("readout address"), and is not applicable to error detection at an address which is not used for readout ("non-readout address"). That is, even if an error occurs at a certain address, occurrence of the error can not be detected until the certain address where the error has occurred is accessed for readout. Thus, the method disclosed in JP No. 8-129510 can not avoid a "read disturb phenomenon".

SUMMARY OF THE INVENTION

The present invention is intended for a memory controller which accesses a memory cell array at the request of a host system for memory access.

The memory controller according to the present invention includes: an access check part for determining whether or not the memory cell array is accessed; and a selected-address error detection part for carrying out error detection at an address which is selected using predetermined algorithm when the memory cell array is not accessed.

By the present invention, error detection is carried out at not only a readout address but also a non-readout address other than the readout address. As a result, it is possible to prevent progress of a "read disturb phenomenon".

According to another aspect of the present invention, the memory controller further includes a readout-address error detection part for carrying out error detection at a readout address.

By the present invention, error detection at a readout address is surely carried out. As a result, it is possible to prevent progress of a "read disturb phenomenon" and occurrence of error at a readout address.

Therefore, it is an object of the present invention to provide techniques for avoiding unintended rewriting of data or reducing the possibility thereof, due to repeated readouts of data from a non-volatile memory.

These and other objects, features, aspects and advantages of the present invention will become more apparent from the following detailed description of the present invention when taken in conjunction with the accompanying drawings.

DESCRIPTION OF THE PREFERRED EMBODIMENTS

<First Preferred Embodiment>
<Components of Memory System>

Hereinafter, the first preferred embodiment of the present invention will be discussed with reference to accompanying drawings. In a "read disturb phenomenon", there is a possibility that data stored at any other address than a readout address may be unintendedly rewritten when data stored at a readout address is repeatedly read out. However, a memory controller according to the first preferred embodiment carries out error detection on an entire area of a memory cell array including readout addresses and non-readout addresses. Thus, as a result of subsequent error correction, it is possible to prevent progress of a "read disturb phenomenon".

Nonetheless, the memory controller is unable to carry out error detection on the memory cell array while the memory cell array is being accessed for readout, writing, or other purposes. As such, the memory controller carries out error detection on the memory cell array when the memory controller determines that the memory cell array is not accessed for readout, writing, or other purposes.

In most instances, however, a time period required for the memory controller to carry out error detection on an entire area of the memory cell array at a time is longer than a time period between completion of one access for readout, writing, or other purposes and start of next access for readout, writing, or other purposes. As such, the memory controller carries out error detection at an address which is selected from the entire area of the memory cell array when the memory controller determines that the memory cell array is not accessed for readout, writing, or other purposes.

Figure 1:
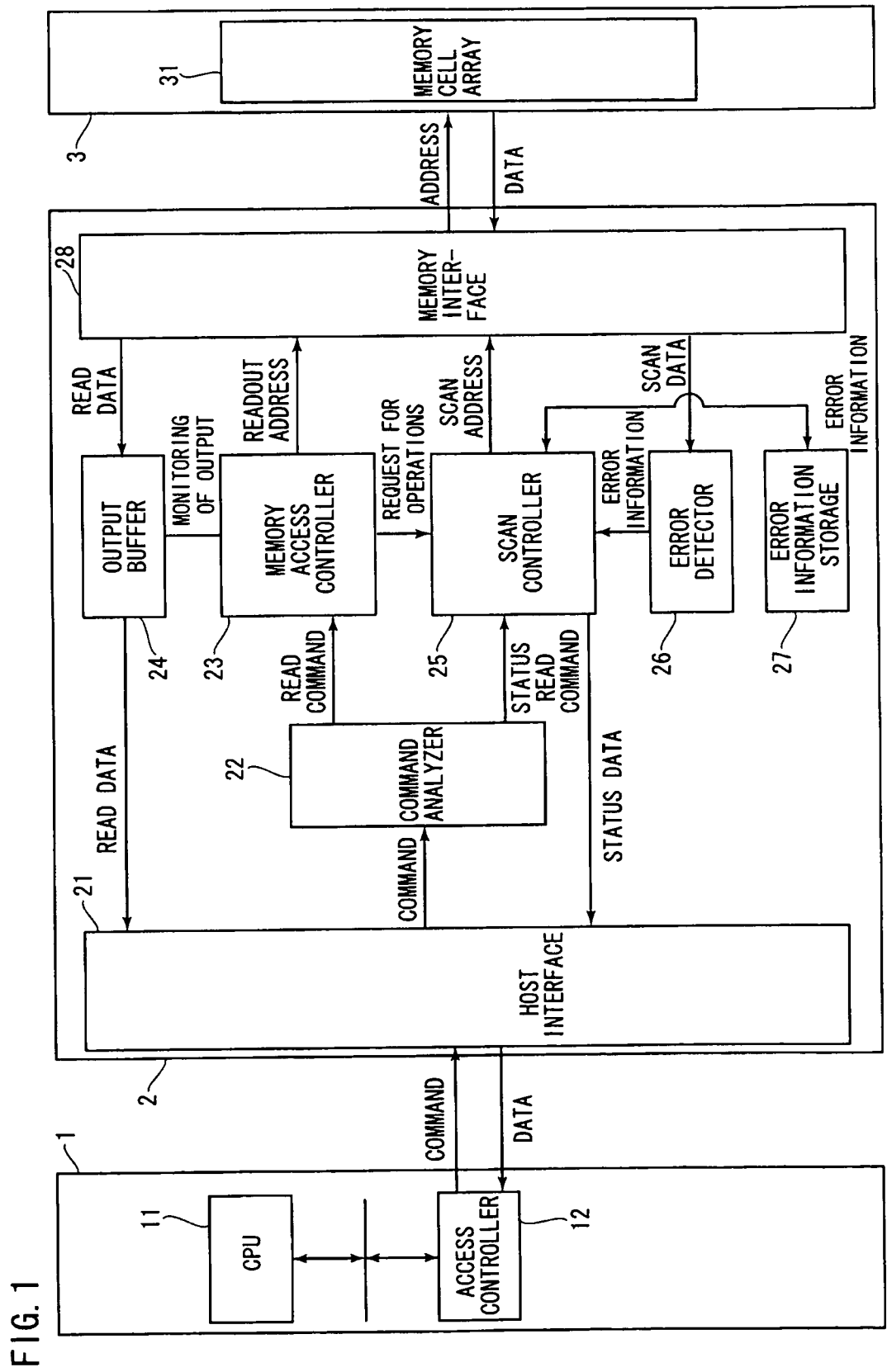
FIG. 1 is a block diagram showing components of a memory system.

FIG. 1 is a block diagram showing components of a memory system according to the first preferred embodiment. The memory system is an information processor, for example, and includes a host system 1, a memory controller 2, a memory 3, and the like. FIG. 1 shows a state in which a memory cell array is accessed for readout.

The host system 1 outputs a command for readout ("read command"), a command for writing ("write command"), and the like to the memory controller 2 in order to request the memory controller 2 to access a memory cell array 31 included in the memory 3, for readout, writing, or other purposes. The host system 1 also outputs a status read command to the memory controller 2 in order to acquire information about error in the memory cell array 31 ("error information") from the memory controller 2.

The memory controller 2 accesses the memory cell array 31 for readout, writing, or other purposes at the request of the host system 1. Also, when the memory controller 2 determines that the memory cell array 31 is not accessed for readout, writing, or other purposes, the memory controller 2 carries out error detection on the memory cell array 31 and stores error information in the memory cell array 31. Then, the memory controller 2 notifies the host system 1 of error information in the memory cell array 31 at the request of the host system 1.

The memory 3 stores data which is processed by the host system 1, in the memory cell array 31. Employable memories as the memory 3 according to the first preferred embodiment include a single-level cell (SLC) NAND flash memory and a multi-level cell (MLC) NAND flash memory. In this regard, however, it is noted that the first preferred embodiment can be applied to a non-volatile memory in which data stored at a non-readout address may possibly be unintendedly rewritten when data stored at a readout address is repeatedly read out.

The host system 1 includes a CPU 11, an access controller 12, and the like. The CPU 11 sets a read command, a write command, a status read command, and the like in the access controller 12. The access controller 12 outputs a read command, a write command, a status read command, and the like to the memory controller 2 upon receipt of instructions for issuance of a command from the CPU 11.

The memory controller 2 includes a host interface 21, a command analyzer 22, a memory access controller 23, an output buffer 24, a scan controller 25, an error detector 26, an error information storage 27, a memory interface 28, and the like.

The host interface 21 is an interface through which a command and data are exchanged between the host system 1 and the memory controller 2.

The command analyzer 22 receives a command from the host system 1, and identifies the received command as one of a read command, a write command, a status read command, and the like. Namely, the command analyzer 22 identifies a type of the received command.

The memory access controller 23 receives a read command, a write command, and the like from the command analyzer 22, and accesses the memory cell array 31 for readout, writing, or other purposes. Also, when the memory access controller 23 determines that the memory cell array 31 is not accessed for readout, writing, or other purposes, the memory access controller 23 requests the scan controller 25, which will be discussed in detail at later paragraphs, to carry out error detection on the memory cell array 31.

The memory access controller 23 confirms that the output buffer 24, which will be discussed in detail at later paragraphs, outputs read data to the host system 1, to thereby determine that the memory cell array 31 is not accessed for readout. Also, the memory access controller 23 confirms that the output buffer 24 does not output write data to the memory 3, to thereby determine that the memory cell array 31 is not accessed for writing.

The output buffer 24 receives read data from the memory 3 and temporally holds the received read data. Then, the output buffer 24 outputs the read data to the host system 1. The output buffer 24 also receives write data from the host system 1 and temporally holds the received write data. Then, the output buffer 24 outputs the write data to the memory 3.

The scan controller 25 indicates a scan address at which error detection is to be carried out to the memory 3 at the request of the memory access controller 23. Also, the scan controller 25 receives a status read command from the command analyzer 22, and notifies the host system 1 of error information in the memory cell array 31.

The scan controller 25 selects an address at which error detection is to be carried out, out of addresses included in the entire area of the memory cell array, in indicating a scan address at which error detection is to be carried out. Methods of selecting an address at which error detection is to be carried out in the scan controller 25 will be discussed with reference to FIGS. 2 through 6 at later paragraphs.

The error detector 26 receives scan data on which error detection is to be carried out from the memory 3. Then, the error detector 26 carries out error detection on the scan data. The error information storage 27 stores error information about the scan data.

The memory interface 28 is an interface through which an address and data are exchanged between the memory controller 2 and the memory 3.

The memory access controller 23 outputs a readout address, a write address, and the like as required by the host system 1. The scan controller 25 outputs a scan address selected from the area of the memory cell array.

In the memory controller 2, a process for accessing the memory cell array 31 for readout, writing, or other purposes in the memory access controller 23 and a process for acquiring scan data in the scan controller 25 are performed distinctly from each other, that is, in different time periods. As a result, in the memory controller 2, a process for accessing the memory cell array 31 and a process for acquiring scan data do not coincide, so that progress of a "read disturb phenomenon" can be prevented.

<Scanning Method for Error Detection>

Next, a method of selecting an address at which the scan controller 25 carries out error detection will be discussed with reference to FIGS. 2 through 6. The following discussion will first deal with how the scan controller 25 scans from a scan starting address, and subsequently deal with how the scan controller 25 selects a scan starting address.

Figure 2:
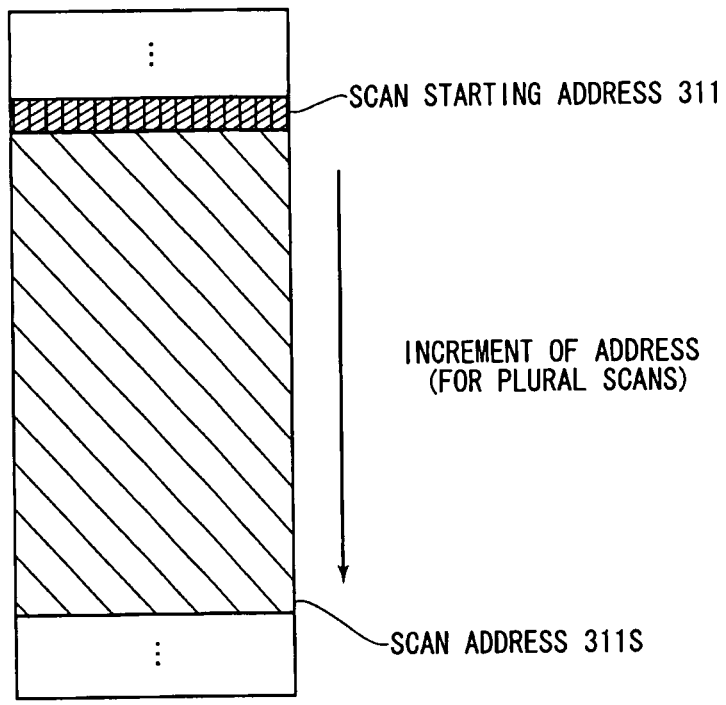
FIG. 2 is a view for showing a scanning method for error detection in a memory cell array.
Figure 3:
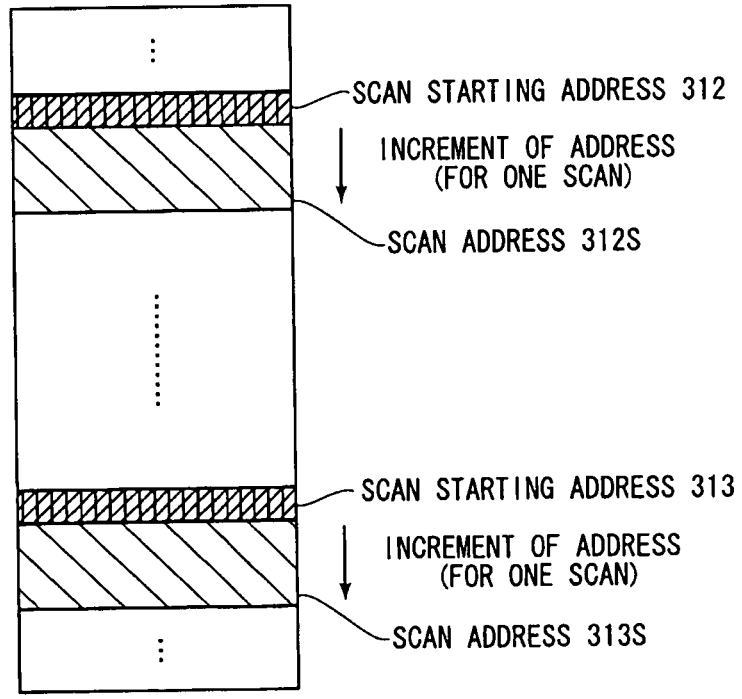
FIG. 3 is a view for showing a scanning method for error detection in a memory cell array.
Figure 4:
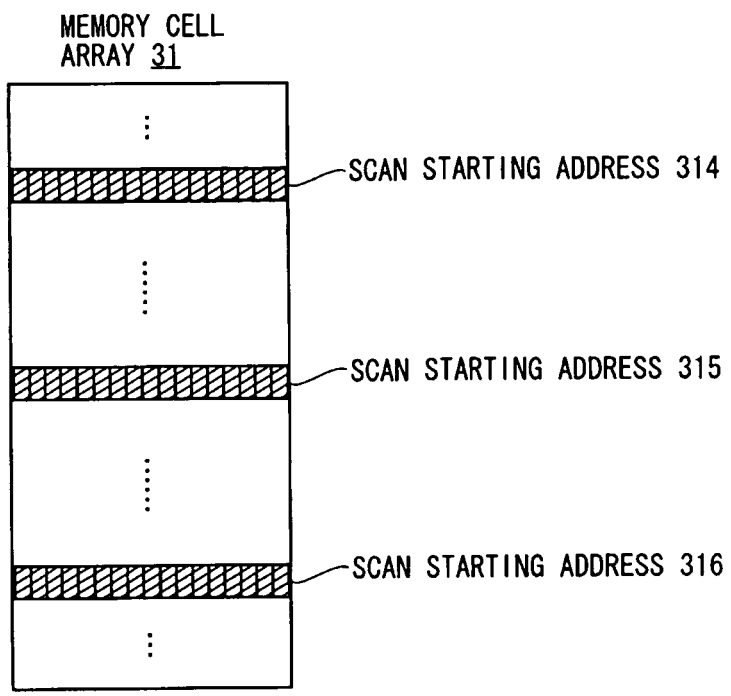
FIG. 4 is a view for showing a scanning method for error detection in a memory cell array.

FIGS. 2, 3, and 4 are views for showing scanning methods for error detection in the memory cell array 31. In FIGS. 2, 3, and 4, scan starting addresses 311 through 316 are illustrated with the use of crosshatch patterns. On the other hand, in FIGS. 2 and 3, scan addresses 311S through 313S, other than scan starting addresses, are illustrated with the use of hatching lines. As is made clear from such illustration, scanning methods for error detection which are respectively shown in FIGS. 2, 3, and 4 are different from one another. Meanwhile, scan starting addresses or scan addresses can be selected in any unit, for example, page by page, block by block, or in a predetermined equally-divided unit of a block, in the memory cell array 31.

In FIG. 2, the scan controller 25 selects the scan starting address 311 when receiving a request for operations from the memory access controller 23. Then, the scan controller 25 performs increment of scan address from the scan starting address 311 until a request for stop is received from the memory access controller 23.

When a request for stop is received from the memory access controller 23, the scan controller 25 suspends the increment of address. Then, the scan controller 25 restarts the increment of address from a scan address at which the increment has been suspended, when next receiving a request for operations from the memory access controller 23. Further, when a request for stop is next received from the memory access controller 23, the scan controller 25 again suspends the increment of address.

Thereafter, the scan controller 25 selects scan addresses in the same manner as discussed above. That is, each time the scan controller 25 receives a request for operations from the memory access controller 23, an address scan is made. Then, as a result of a plurality of address scans, the scan address 311 S which is continuous with the scan starting address 311 is selected.

When the scan controller 25 initially selects a scan address on receiving the present request for operations from the memory access controller 23, the scan controller 25 must identify the scan address which the scan controller 25 selected on receiving the last request for stop from the memory access controller 23. To this end, the scan controller 25 or any of the other components of the memory controller 2 may comprise a part for storing the scan address which the scan controller 25 selected on receiving the last request for stop from the memory access controller 23.

In FIG. 3, the scan controller 25 selects the scan starting address 312 when receiving a request for operations from the memory access controller 23. Then, the scan controller 25 performs increment of scan address from the scan starting address 312 until a request for stop is received from the memory access controller 23, to finally select the scan address 312S.

The scan controller 25 suspends the increment of address when receiving a request for stop from the memory access controller 23. Then, the scan controller 25 selects the scan starting address 313 when next receiving a request for operations from the memory access controller 23. Further, the scan controller 25 performs increment of scan address from the scan starting address 313 until a request for stop is next received from the memory access controller 23, to finally select the scan address 313S.

Thereafter, the scan controller 25 selects scan addresses in the same manner as discussed above. That is, each time the scan controller 25 receives a request for operations from the memory access controller 23, an address scan is made. Then, a scan address which is continuous with each scan starting address is selected in each of address scans. According to the method shown in FIG. 3, unlike the method shown in FIG. 2, scan addresses which are finally selected as a result of a plurality of address scans are not necessarily continuous with the same scan starting address.

In FIG. 4, the scan controller 25 selects the scan starting address 314 when receiving a request for operations from the memory access controller 23. Then, the scan controller 25 selects the scan starting addresses 315 and 316 when receiving the second and third requests for operations from the memory access controller 23, respectively.

Thereafter, the scan controller 25 selects scan addresses in the same manner as discussed above. That is, each time the scan controller 25 receives a request for operations from the memory access controller 23, an address scan is made. Then, only a scan starting address is selected in each of address scans. In this regard, plural scan starting addresses may be selected in each of address scans. According to the method shown in FIG. 4, unlike the methods shown in FIGS. 2 and 3, a scan address which is continuous with a scan starting address is not selected in each of address scans.

In FIGS. 2, 3, and 4, as a result of a plurality of address scans, error detection can be carried out on a wide range of area which is not limited by readout addresses, out of the entire area of the memory cell array. Also, as a method of selecting a scan address which is continuous with a scan starting address, not only a method utilizing increment of address, but also a method utilizing decrement of address can be employed.

Further, as a generalized version of the method of selecting a scan address which is continuous with a scan starting address, a method of selecting a scan address which is related to a scan starting address can also be employed. More specifically, after a scan starting address is selected, a scan address is selected in accordance with the selected scan starting address and a predetermined rule. According to one example thereof, in a case where a scan starting address and a scan address are selected on a page-by-page basis of the memory cell array 31, a scan page is selected every several pages from a scan starting page. Also, according to another example thereof, in a case where the first page of the first block is selected as a scan starting page, the first page of the second block and the first page of the third block are selected as scan pages.

The scanning methods for error detection which are shown in FIGS. 2, 3, and 4 can be combined with one another. For example, in a whole time period from turn-on to turn-off of the memory system, the method shown in FIG. 2 is employed in an initial stage, subsequently the method shown in FIG. 3 is employed in an middle stage, and the method shown in FIG. 4 is employed in a final stage.

Next, a method of selecting a scan starting address in the scan controller 25 will be discussed. According to the first preferred embodiment, addresses which can be treated as a scan starting address are as follows: (1) an address selected by generation of random numbers; (2) an address in which an error is most likely to occur; (3) an address in which an error has occurred; and (4) an address at which important data is stored.

A method of selecting a scan starting address by generation of random numbers in the scan controller 25 will be discussed. The scan controller 25 determines which page in which block is selected as a scan starting address by generation of random numbers. Thus, by a plurality of address scans, it is possible to carry out error detection on a wide range of area in the memory cell array 31.

In this regard, the scan controller 25 may select a scan starting address by using random numbers generated by the host system 1. In this case, the host system 1 outputs a command and random numbers to the memory controller 2. If the host system 1 recognizes addresses at which important data is stored, the host system 1 may select a scan starting address from those addresses by generation of random numbers. Further, the scan controller 25 may select a scan starting address by using a command output from the host system 1. In this case, the scan controller 25 can generate random numbers by using a bit stream of the command.

Figure 5:
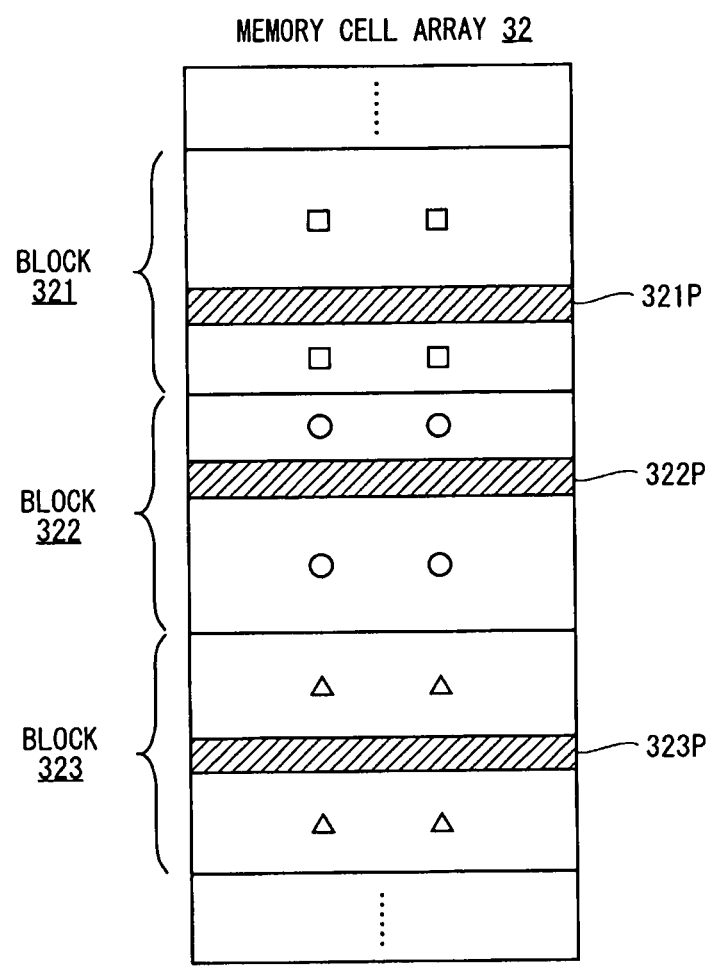
FIG. 5 is a view for showing a "read disturb phenomenon" in an SLC NAND flash memory.
Figure 6:
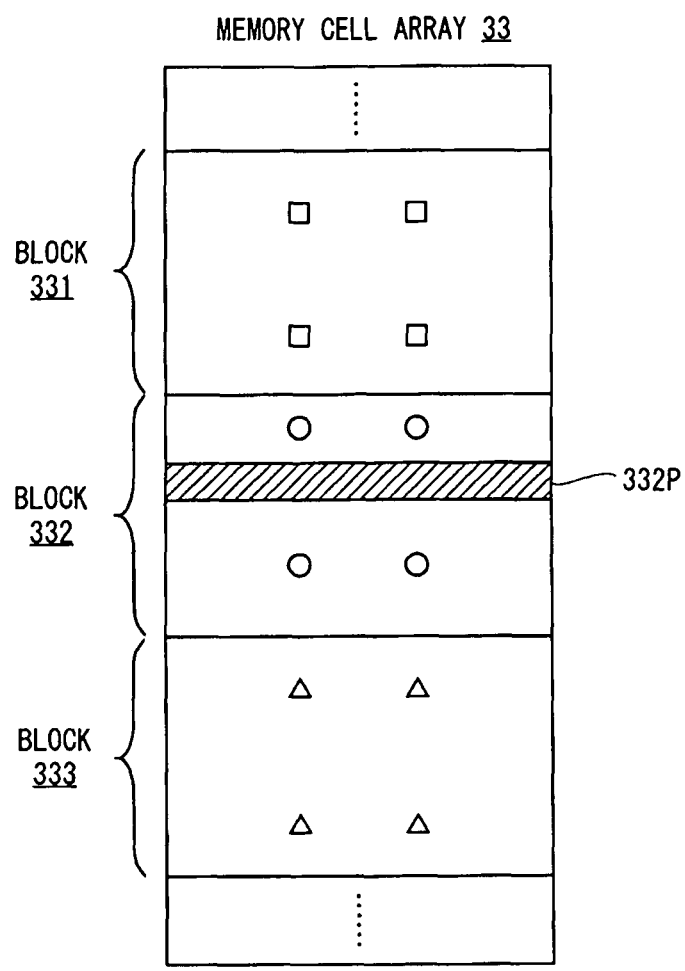
FIG. 6 is a view for showing a "read disturb phenomenon" in an MLC NAND flash memory.

A method of selecting an address in which an error is most likely to occur as a scan starting address in the scan controller 25 will be discussed. Such error includes an error caused due to a "read disturb phenomenon". FIG. 5 is a view for showing a "read disturb phenomenon" occurring in an SLC NAND flash memory. FIG. 6 is a view for showing a "read disturb phenomenon" occurring in an MLC NAND flash memory.

In FIG. 5, a memory cell array 32 in an SLC NAND flash memory includes a plurality of blocks 321, 322, 323, and the like. Each of the blocks 321, 322, and 323 includes a plurality of pages such as a page 321P, a page 322P, and a page 323P which are illustrated by hatching lines.

When the memory controller 2 accesses the page 321P for readout, unselected cells which form pages other than the page 321P in the block 321 are in a very weak writing condition. In other words, there is a possibility that a "read disturb phenomenon" may occur in pages other than the page 321P in the block 321. In FIG. 5, how a "read disturb phenomenon" occurs is schematically illustrated by symbols of squares in the block 321.

When the memory controller 2 accesses the pages 322P and 323P for readout, there is a possibility that a "read disturb phenomenon" may occur in pages other than the pages 322P and 323P in the blocks 322 and 323, respectively. In FIG. 5, how a "read disturb phenomenon" occurs is schematically illustrated by symbols of circles and symbols of triangles in the blocks 322 and 323, respectively.

When access to the page 321P for readout is completed, the scan controller 25 can select not only the page 321P which is a readout address, but also other pages in the block 321 which are not readout addresses, as a scan starting address. In order for the scan controller 25 to select a scan starting address in the foregoing manner, the scan controller 25 is configured to be notified of a readout address by the memory access controller 23.

In FIG. 6, a memory cell array 33 in an MLC NAND flash memory includes a plurality of blocks 331, 332, 333, and the like. The block 332 includes a plurality of pages such as a page 332P which is illustrated by hatching lines.

When the memory controller 2 accesses the page 332P for readout, there is a possibility that a "read disturb phenomenon" may occur in pages other than the page 332P in the block 332 and in related blocks other than the block 332. In FIG. 6, blocks 331 and 333 are shown as the related blocks other than the block 332. Also, in FIG. 6, how a "read disturb phenomenon" occurs is schematically illustrated by using symbols of squares, symbols of circles, and symbols of triangles in the blocks 331, 332, and 333, respectively.

When access to the page 332P for readout is completed, the scan controller 25 can select not only the page 332P which is a readout address, but also pages in the blocks 331, 332, and 333 which are not readout addresses, as a scan starting address. To this end, in the instance of FIG. 6, like the instance of FIG. 5, the scan controller 25 is configured to be notified of a readout address by the memory access controller 23. Also, a diffusion table which indicates that a "read disturb phenomenon" may probably diffuse into the related blocks other than the readout block is provided in the scan controller 25 or any of the other components of the memory controller 2.

A method of selecting an address in which an error has occurred as a scan starting address in the scan controller 25 will be discussed. Such error includes an error caused due to a "read disturb phenomenon". The scan controller 25 can acquire information about addresses at which an error has occurred from the error information storage 27 or the like. Then, the scan controller 25 selects an address at which an error has most frequently occurred as a scan starting address, for example.

A method of selecting an address at which important data is stored as a scan starting address in the scan controller 25 will be discussed. In this method, information about addresses at which important data is stored is provided in the scan controller 25 or any of the other components of the memory controller 2. Then, the scan controller 25 can select an address at which data that is expected to be the most important is stored, as a scan starting address, for example.

As a method of scanning from a scan starting address in the scan controller 25, the three methods which have been discussed above with reference to FIGS. 2, 3, and 4 are cited. Also, as a method of selecting a scan starting address in the scan controller 25, the above-discussed four methods are cited. Thus, as a method of selecting an address at which error detection is to be carried out in the scan controller 25, twelve methods are cited. Those twelve methods can be chosen depending on each purpose.

For example, in a case where the scan controller 25 selects a scan starting address by generation of random numbers and makes an address scan by the method shown in FIG. 2, it is possible to easily carry out error detection on a wide range of area which is not limited by readout addresses. On the other hand, in a case where the scan controller 25 selects an address at which important data is stored as a scan starting address and makes an address scan by the method shown in FIG. 4, it is possible to carry out error detection intensively at an address at which important data is stored.

<Process Flow>

Figure 7:
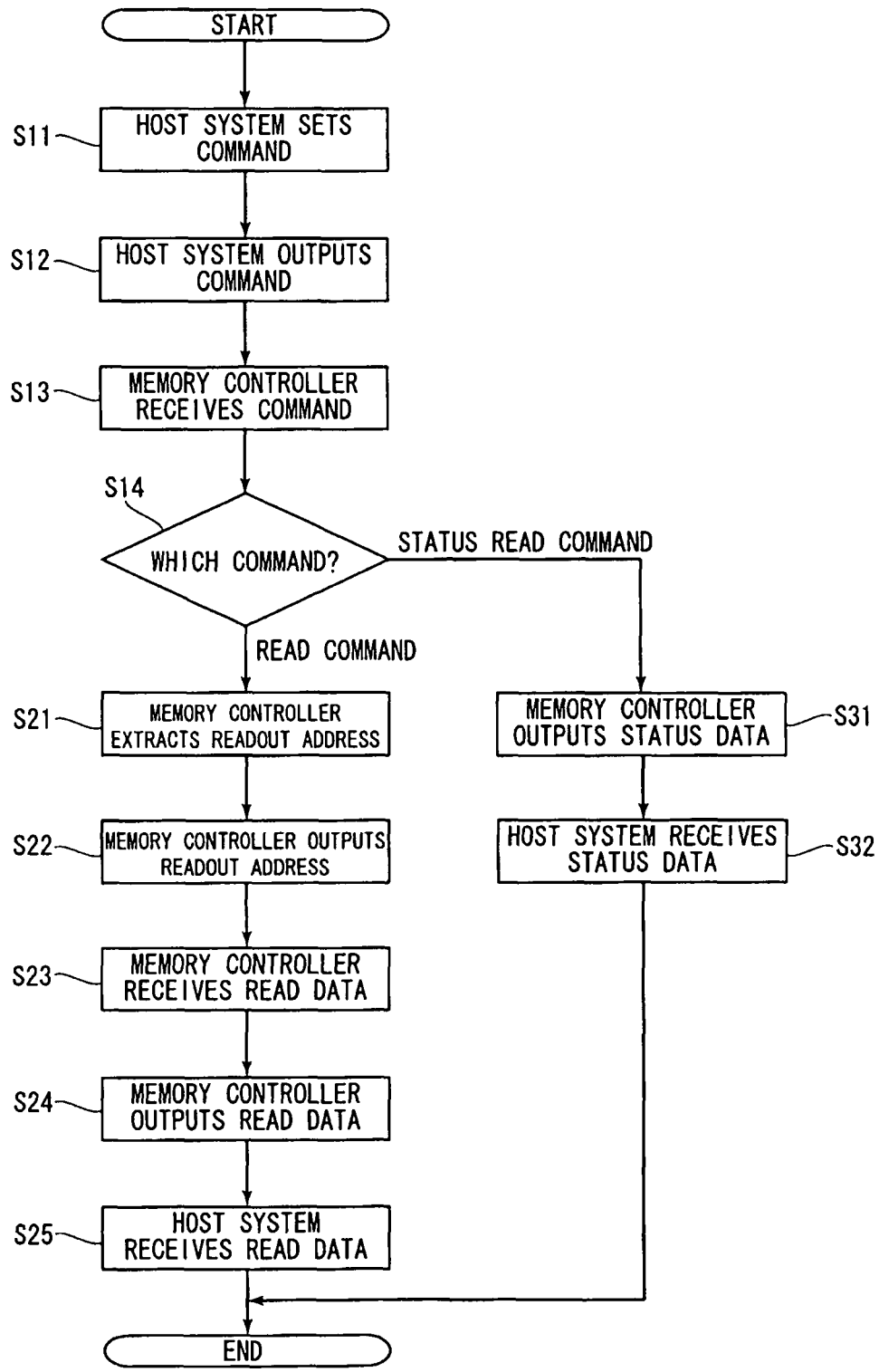
FIG. 7 is a flow chart showing processes performed by a host system in order to acquire data.
Figure 8:
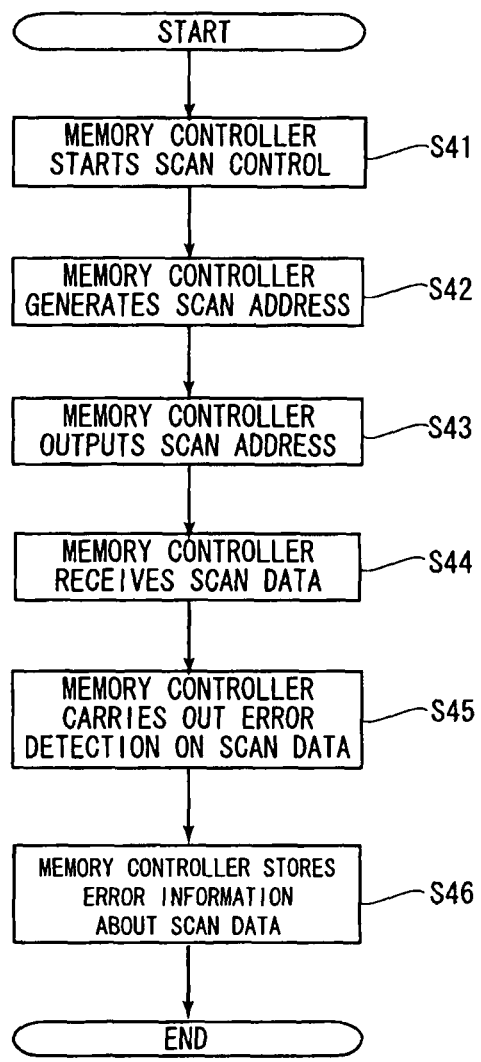
FIG. 8 is a flow chart showing processes performed by a memory controller in order to detect an error.

Now, a process flow will be discussed in the following order: (1) issuance of command; (2) acquisition of data; (3) error detection; and (4) notification of error. FIG. 7 is a flow chart for showing processes performed by the host system 1 in order to acquire data. FIG. 8 is a flow chart for showing processes performed by the memory controller 2 in order to detect an error. The following discussion about a process flow will deal with a case where the memory cell array 31 is accessed for readout. However, a process flow which is substantially the same with the following process flow can be applied to a case where the memory cell array 31 is accessed for writing or other purposes.

The CPU 11 sets a read command or a status read command in the access controller 12 (step S11). Subsequently, the CPU 11 gives instructions for issuance of a read command or a status read command to the access controller 12 (step S12).

The command analyzer 22 receives a read command or a status read command from the host system 1 via the host interface 21 (step S13).

When the command analyzer 22 determines that a read command is received, the command analyzer 22 then outputs the received read command to the memory access controller 23 ("READ COMMAND" in step S14). On the other hand, when the command analyzer 22 determines that a status read command is received, the command analyzer 22 then outputs the received status read command to the scan controller 25 ("STATUS READ COMMAND" in step S14).

First, a case where the command analyzer 22 receives a read command will be discussed ("READ COMMAND" in step S14). The memory access controller 23 decodes the read command output from the command analyzer 22, and extracts a readout address (step S21). Then, the memory access controller 23 outputs the readout address to the memory 3 via the memory interface 28 (step S22).

The output buffer 24 receives read data from the memory 3 via the memory interface 28 (step S23). Then, the output buffer 24 outputs the read data to the host system 1 via the host interface 21 (step S24). The CPU 11 receives the read data from the access controller 12 (step S25), and processes the read data.

The memory access controller 23 monitors the output buffer 24 by using a surveillance wire, as to whether or not the output buffer 24 outputs read data to the host system 1. When the output buffer 24 outputs read data to the host system 1, it means that the memory cell array 31 is not accessed for readout. The memory access controller 23 makes a request for operations to the scan controller 25 when it is confirmed that the output buffer 24 outputs read data to the host system 1. The scan controller 25 starts scanning control upon receipt of a request for operations from the memory access controller 23 (step S41).

However, even when the output buffer 24 outputs read data to the host system 1, the scan controller 25 can not make time for scanning for error detection occasionally. For example, in a case where the memory access controller 23 receives read commands which are consecutively output in a stream from the host system 1, the scan controller 25 can not make time for scanning. In this case, the memory access controller 23 identifies received commands as a stream of read commands which are consecutively output, and makes no request for operations to the scan controller 25.

In this regard, the scan controller 25 exercises scanning control in the following situations, in addition to the situation where the output buffer 24 outputs read data to the host system 1. For example, the scan controller 25 exercises scanning control in a situation where the output buffer 24 does not output write data to the memory 3. In this situation, the memory access controller 23 makes a request for operations to the scan controller 25 when it is confirmed that the output buffer 24 does not output write data to the memory 3.

Further, the scan controller 25 exercises scanning control in a situation where the host system 1 does not request the memory controller 2 to access the memory cell array 31 for readout, writing, or other purposes, and also in a situation where the host system 1 is turned on or off. Moreover, the scan controller 25 exercises scanning control in a situation where the host system 1 requests the memory controller 2 to access the other devices such as a backup device, than the memory cell array 31. In the foregoing situations, a CPU monitor for monitoring the CPU 11, which is provided in the memory controller 2, makes a request for operations to the scan controller 25.

The scan controller 25 generates a scan address by the method of selecting an address at which error detection is to be carried out, which method has been discussed above with reference to FIGS. 2 through 6 (step S42). Also, the scan controller 25 temporally holds the scan address. Then, the scan controller 25 outputs the scan address to the memory 3 via the memory interface 28 (step S43).

The error detector 26 receives scan data on which error detection is to be carried out from the memory 3 via the memory interface 28 (step S44). Subsequently, the error detector 26 carries out error detection on the scan data (step S45). Then, the error detector 26 notifies the scan controller 25 of error information.

If no error is detected in the scan data, the scan controller 25 erases the scan address which has been held until that time.

If an error is detected in the scan data, the scan controller 25 notifies the error information storage 27 of the fact that an error is detected with respect to the scan address which is being held (step S46). Then, the scan controller 25 erases the scan address which has been held until that time.

Next, the case where the command analyzer 22 receives a status read command will be discussed ("STATUS READ COMMAND" in step S14). The scan controller 25 acquires error information from the error information storage 27. Then, the scan controller 25 outputs status data serving as error information to the host system 1 via the host interface 21 (step S31). The CPU 11 receives the status data from the access controller 12 (step S32) in preparation for subsequent error correction.

In this regard, the host system 1 outputs a status read command to the memory controller 2 in the following situations. The host system 1 outputs a status read command to the memory controller 2 in a situation where a trigger periodically occurs in the host system 1, and in a situation where the host system 1 is turned on or off. Further, the host system 1 outputs a status read command to the memory controller 2 in a situation where the host system 1 has output a read command the number of times larger than predetermined times.

Alternatively, the scan controller 25 may cause an interrupt, to thereby notify the host system 1 of the fact that the error information is notified of by the error detector 26. The host system 1 can receive the status data serving as error information by outputting a status read command to the scan controller 25. Also, the host system 1 can receive the status data directly from the error information storage 27, not via the scan controller 25.

Further, the scan controller 25, the error detector 26, and the error information storage 27 may alternatively be provided in the host system 1. In this case, the host system 1 outputs a scan address to the memory controller 2 in the scan controller 25 when a read command or a write command is not output to the memory controller 2. Then, the host system 1 carries out error detection on scan data in the error detector 26, and stores error information in the error information storage 27.

<Second Preferred Embodiment>

According to the first preferred embodiment, the error detector 26 carries out error detection on data stored at a scan address. Then, the host system 1 acquires error information about the data stored at a scan address. In contrast thereto, according to the second preferred embodiment, the error detector 26 carries out error detection on data stored at a scan address and a readout address. Then, the host system 1 acquires error information about the data stored at a scan address and a readout address.

Figure 9:
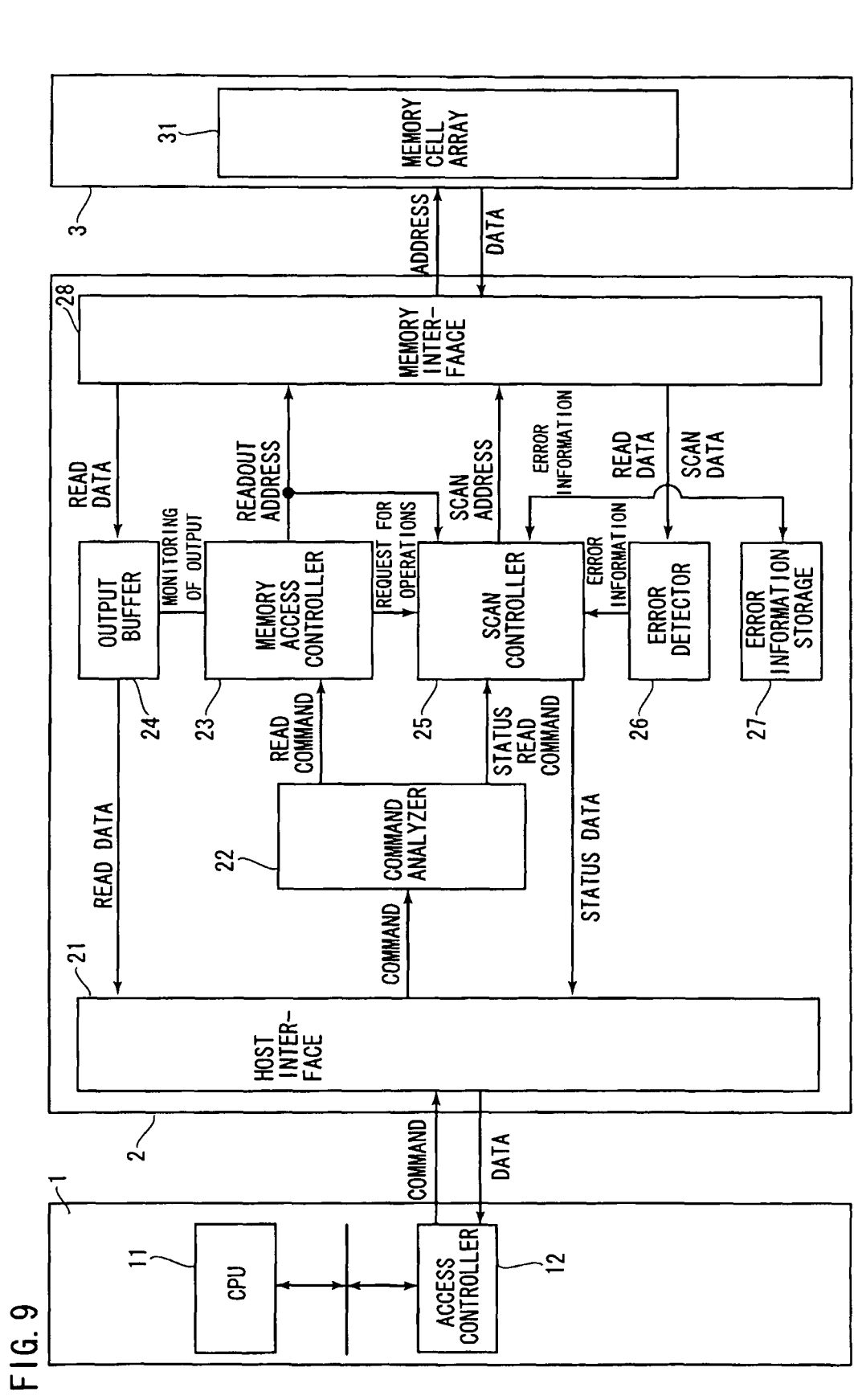
FIG. 9 is a block diagram showing components of a memory system.

First, a memory system according to the second preferred embodiment will be discussed with reference to FIG. 9. The following discussion will mainly focus on differences between the memory system according to the first preferred embodiment which is shown in FIG. 1 and the memory system according to the second preferred embodiment which is shown in FIG. 9.

The memory access controller 23 outputs a readout address to not only the memory 3, but also the scan controller 25. The scan controller 25 receives the readout address from the memory access controller 23, and temporally holds the readout address. In the second preferred embodiment, like the first preferred embodiment, the scan controller 25 selects a scan address by itself, and temporally holds the selected scan address.

The error detector 26 receives not only scan data, but also read data, from the memory 3. The error detector 26 carries out error detection on both the scan data and the read data as received. The error detector 26 notifies the scan controller 25 of error information about the scan data and the read data. The scan controller 25 stores the error information about the scan data and the read data in the error information storage 27.

Figure 10:
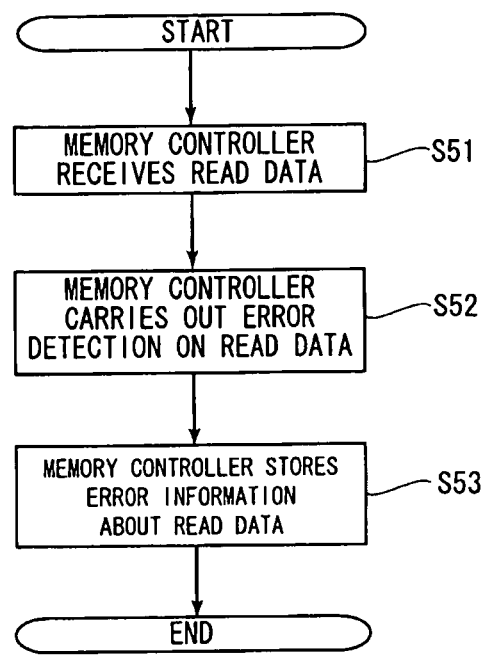
FIG. 10 is a flow chart showing processes performed by a memory controller in order to detect an error.
Figure 11:
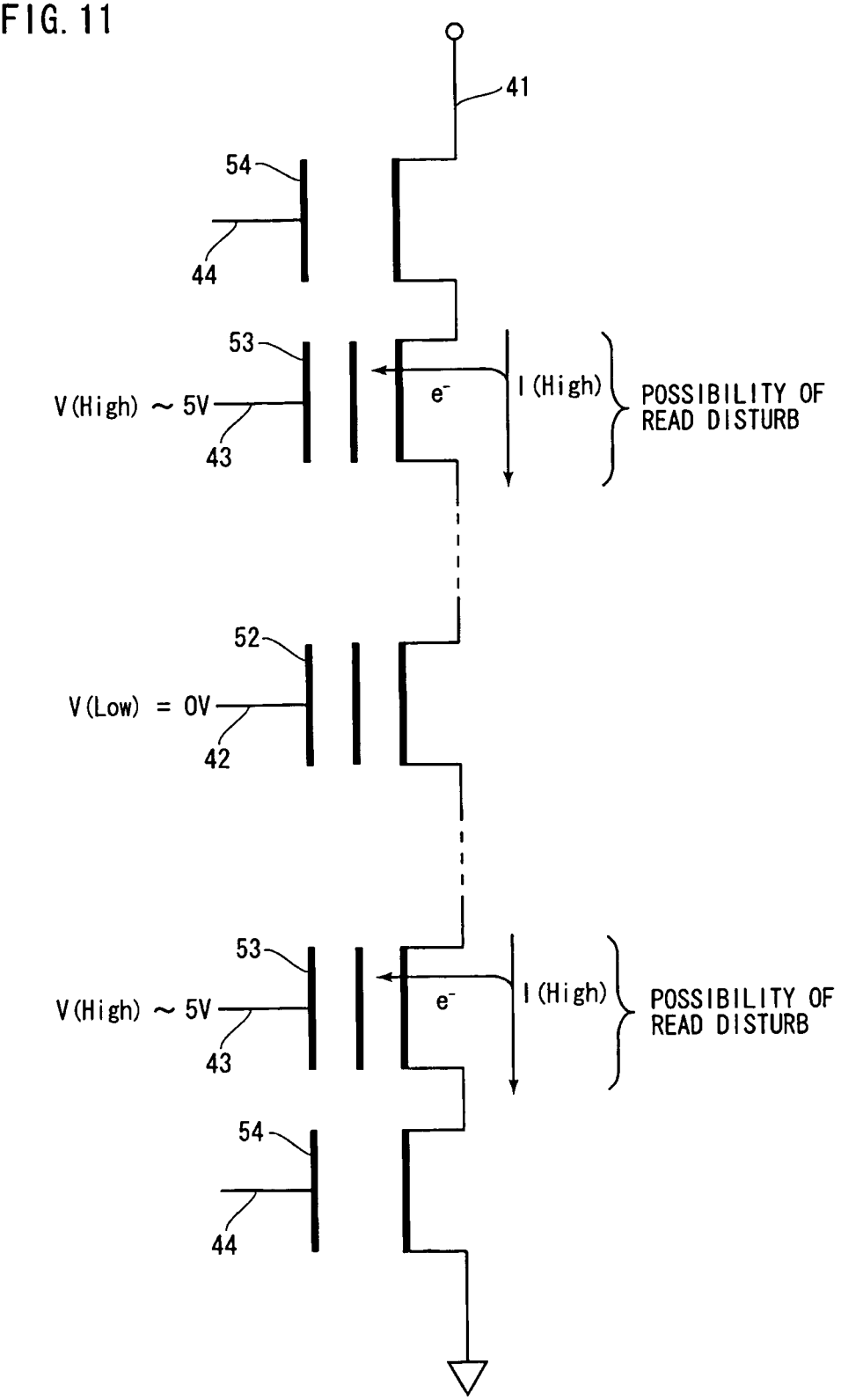
FIG. 11 is a schematic diagram showing a NAND flash memory.

Next, a process flow according to which the memory controller 2 detects an error in read data will be discussed with reference to FIG. 10. In this regard, a part of the process flow from a time when the CPU 11 sets a read command in the access controller 12 (step S11) to a time when the memory access controller 23 extracts a readout address (step S21) is identical to that according to the first preferred embodiment.

According to the first preferred embodiment, the memory access controller 23 outputs a readout address only to the memory 3 (step S22). In contrast thereto, according to the second preferred embodiment, the memory access controller 23 outputs a readout address to not only the memory 3 (step S22), but also the scan controller 25. The scan controller 25 receives the readout address from the memory access controller 23, and temporally holds the received readout address.

A part of the process flow from a time when the output buffer 24 receives read data (step S23) to a time when the CPU 11 receives the read data from the access controller 12 (step S25) is identical to that according to the first preferred embodiment.

The error detector 26 receives the read data from the memory 3 (step S51). The error detector 26 carries out error detection on the read data (step S52). Then, the error detector 26 notifies the scan controller 25 of error information about the read data.

The scan controller 25 erases the readout address which has been held until that time if no error is detected in the read data.

If an error is detected in the read data, the scan controller 25 notifies the error information storage 27 of the fact that an error is detected with respect to the readout address which is being held (step S53). Then, the scan controller 25 erases the readout address which has been held until that time.

A part of the process flow from a time when the scan controller 25 starts scanning control (step S41) to a time when the scan controller 25 notifies the error information storage 27 of the fact that an error is detected with respect to a scan address (step S46) is identical to that according to the first preferred embodiment. Also, a part of the process flow from a time when the CPU 11 sets a status read command in the access controller 12 (step S11) to a time when the CPU 11 receives status data from the access controller 12 (step S32) is identical to that according to the first preferred embodiment.

The host system 1 can acquire error information about data stored at a scan address and a readout address from the same component, the error information storage 27. Then, the host system 1 can make preparations for subsequent error correction based on the error information as acquired.

While the invention has been shown and described in detail, the foregoing description is in all aspects illustrative and not restrictive. It is therefore understood that numerous modifications and variations can be devised without departing from the scope of the invention.

What is claimed is:

1. A memory controller which accesses a memory cell array at a request of a host system for memory access for a plurality of operations, comprising:
   an access check part for determining whether or not said memory cell array is accessed for one of the plurality of operations at the request of the host system; and
   a selected-address error detection part for accessing the memory cell array to perform an error detection operation when said memory cell array is not accessed for the one of the plurality of operations at the request of the host system, the error detection operation being performed at an address of the memory cell array which is selected using a predetermined algorithm.

2. The memory controller according to claim 1, further comprising:
   a readout-address error detection part for carrying out error detection at a readout address.

3. The memory controller according to claim 1, wherein said selected-address error detection part selects an error-detection starting address at a time of one error detection, and performs the error detection operation at a related address at said time of one error detection and at a time of subsequent error detection, wherein the related address is selected based on a predetermined rule defining a relation between the selected error-detection starting address and the related address.

4. The memory controller according to claim 1, wherein said selected-address error detection part selects an error-detection starting address each time error detection is required, and performs the error detection operation at a related address each time said error detection is required, wherein the related address is selected based on a predetermined rule defining a relation between the selected error-detection starting address and the related address.

5. The memory controller according to claim 1, wherein said selected-address error detection part selects an error-detection starting address each time error detection is required, and performs the error detection operation at said error-detection starting address.

6. The memory controller according to any one of claims 3 through 5, wherein said error-detection starting address includes an address determined by generation of random numbers.

7. The memory controller according to any one of claims 3 through 5, wherein said error-detection starting address includes an address at which an error may occur due to access for readout.

8. The memory controller according to any one of claims 3 through 5, wherein said error-detection starting address includes an address at which an error has occurred due to access for readout.

9. The memory controller according to any one of claims 3 through 5, wherein said error-detection starting address includes a predetermined address.

10. The memory controller according to claim 1, wherein said access check part includes a part for determining whether or not read data is output to said host system.

11. The memory controller according to claim 1, wherein said access check part includes a part for determining whether or not write data is output to said memory cell array.

12. The memory controller according to claim 1, wherein said access check part includes a part for determining whether or not access is requested by said host system.

13. The memory controller according to claim 1, wherein said access check part includes a part for determining whether or not power of said host system is switched between an on state and an off state.

14. The memory controller according to claim 1, further comprising:
- an error notification part for notifying said host system of information about error detection at a request of said host system therefor.

15. The memory controller according to claim 14, wherein said error notification part includes
- an information storage part for storing information about error detection; and
- a part for notifying said host system of information about error detection which is stored in said information storage part, at a request of said host system therefor.

16. The memory controller according to claim 14, wherein said error notification part includes a part for causing an interrupt for said host system to request information about error detection when occurrence of error is detected in said memory cell array.

* * * * *